United States Patent [19]
Heimann

[11] 3,827,812
[45] Aug. 6, 1974

[54] METHOD OF AND APPARATUS FOR TESTING THE CONDITION OF BOTTLES

[75] Inventor: Helmut Heimann, Wuppertal-Barmen, Germany

[73] Assignee: Wickuler-Kupper-Braverei KGaA, Wuppertal-Barmen, Germany

[22] Filed: Feb. 8, 1973

[21] Appl. No.: 330,827

[30] Foreign Application Priority Data
Feb. 9, 1972  Germany............................ 2206054

[52] U.S. Cl............ 356/240, 209/111.7, 250/223 B
[51] Int. Cl....................... G01n 21/16, G01n 21/32
[58] Field of Search................. 356/240; 250/223 B; 209/111.7

[56] References Cited
UNITED STATES PATENTS

| | | | |
|---|---|---|---|
| 3,228,520 | 1/1966 | Schneider........................ | 250/223 B |
| 3,351,198 | 11/1967 | Wyman............................. | 356/240 |
| 3,439,178 | 4/1969 | Rottmann........................ | 250/223 B |
| 3,456,788 | 7/1969 | Stapf et al....................... | 250/223 B |
| 3,478,221 | 11/1969 | Sainsbury....................... | 250/223 B |
| 3,631,255 | 12/1971 | Gender et al..................... | 356/240 |

*Primary Examiner*—Vincent P. McGraw
*Attorney, Agent, or Firm*—Markva & Smith

[57] ABSTRACT

Apparatus for testing the condition of a bottle includes first and second scanner devices for transmitting light beams through the bottle respectively in the vicinity of the bottom of the bottle and at another level at which the cross-section of the bottle is about the same as in the vicinity of the bottom of the bottle. The respective light beams are then sensed by photocells which transmit their respective signals to an amplifier for comparing the electrical signals and generating a further signal when the electrical signals differ by a predetermined amount. The further signal is utilized to actuate a device for ejecting bottles partially filled with liquid such as lye which cause the light transmission of the two light beams to differ. A sensing device is also provided for assuring that the attitude of the bottle is appropriate before testing.

11 Claims, 4 Drawing Figures

METHOD OF AND APPARATUS FOR TESTING THE CONDITION OF BOTTLES

The present invention is concerned with a method of and apparatus for testing the condition of glass bottles and particularly for detecting by means of a light beam scanning system the residual lye in washed bottles.

In breweries and bottling plants, previously used bottles for beverages are washed with lye before being refilled. The washed bottles after being rinsed are normally subjected to an optical test to determine whether any foreign bodies are in the bottles. In other words, an optical test is carried out to determine whether the interior of each of the bottles has any darkened area. This optical check is effected in a vertical direction so that only those faults are discovered which appear at or above the bottom of the bottles.

Although it is common practice for the bottles, after being rinsed out with lye, to be turned while being conveyed so that the lye solution can flow out, there frequently remains in some bottles residual lye which cannot run out when the bottles are turned because the necks of the bottles are stopped up. This is usually caused by stripped-off labels or the like which manage to enter the bottles during washing. If this residual lye is not detected, the bottle will subsequently be filled with the appropriate beverage, for example, beer, at the next filling stage resulting in the beverage being contaminated with lye. Lye, when drunk, can cause injuries to the gullet and to the stomach.

Because bottles are made from glass of various colors, the automatic detection of residual lye in a washed bottle is difficult.

The problem with which the present invention is concerned is to devise a method by which the condition of bottles can be determined optically and which is particularly suitable for checking for residual lye content in washed bottles. This problem is solved according to the present invention by a pair of light beams, one scanning the lower region of the bottle and the other scanning a higher region of the bottle. The two signals resulting from the separate scanning operations are then compared with one another.

In accordance with the present invention the light transmission in the upper region of the bottle and that in the lower region are compared. As a rule, after a bottle is washed and turned upright, there is no longer any liquid in the upper region of the bottle, so that this region is certain to be empty. On the other hand, residual lye or other liquids may be in the lower region of the bottle which will influence the passage of light. The signals from the upper and lower light beam scanning operations are compared with one another. If they are approximately equal, it can be assumed that the lower region of the bottle, like the upper region, is empty. If there is a greater degree of light absorption in the lower region than in the upper, the bottle must be separated and rejected as it probably contains residual lye.

Scanning by the upper light beam provides a reference signal which takes into account the optical transmission properties of the empty bottle. These transmission properties are influenced by the bottle coloring and by the thickness and composition of the glass. The measurement of transmission by the lower light beam is compared with this reference signal. To assure detection of relatively small amounts of residual lye, scanning by the lower light beam is carried out as closely as possible to the bottom of the bottle. However, a minimum distance must be maintained above the bottom of the bottle, as the bottom itself would affect transmission of the light.

Apparatus according to the invention for testing the condition or content of bottles comprises first and second scanner devices each consisting of a light source and a photocell so arranged relative to the bottles to be tested that the light beams pass transversely through the bottles respectively in the vicinity of the bottom of each bottle and at a level at which the cross-section of the bottle is about the same as at the level of the first scanner device, and an amplifier for comparing the electrical signals from the two photocells and generating a switching signal when the signals differ by a predetermined degree.

Comparison of the two scannings at regions of equal cross-section of a bottle leads to greater accuracy because the beam of light is as a rule somewhat influenced by the lateral regions of the bottle walls. This influence is greater at small cross-sectional dimensions than at large ones. Normally, beer bottles are somewhat cylindrical in the lower region and taper towards the neck of the bottle. The upper light beam scanning should take place at the upper end of the cylindrical region.

Although the apparatus according to the invention is particularly suitable for detecting the residual lye content of a washed bottle, it is possible also to use it for determining the filled state of bottles. The only important point is that the light beam scanning operations should take place respectively in a region of the bottle where there is certain to be no liquid and in another region where the presence of liquid is possible or even probable.

In order to reduce the risk of erroneous evaluation of bottles, in a further embodiment of the invention a sensing or third scanner device adapted to determine the attitude of a bottle in the test position is so connected to the amplifier output that it allows the output signal to become effective only when a bottle is located in the test position. Therefore, the test is carried out only when the bottle is positioned with its widest point in line with the scanner devices or when it is situated centrally in front of the scanner devices. In the side regions there are additional light beam deflections and refractions due to the fact that the bottle walls are not quite smooth and even, so that such edge measurements do not give accurate results.

The sensing or third scanner device is preferably located at the level of the tapered bottle neck and consists of a light source and a photocell. The bottle neck located centrally of the bottle generates the signal for evaluation of the light beam scanning. The diameter of the bottle neck is decisive for that region in which the light beam scanning and the comparison of the light beams is effectively carried out. In this way the edge regions of the bottle are excluded from the scanning.

If the scanner devices have produced different output signals from a bottle, means is provided for separating this bottle from the normal path along which the bottles are conveyed. It is possible, for example, to stop the entire conveying line in order to separate out manually the bottle which is exactly in front of the scanner devices. In checking bottles for residual lye, such a method of operation is feasible since the possibility that a bottle containing residual lye would be present is relatively remote. Interruptions in the sequence of operations are however avoided if the removal of the undesirable bottles take place automatically. This can, for example, be effected with suction devices in which the faulty bottles are held fast by a suction cup and are pulled into a special track from the main path of the bottles. It is also possible to provide a branch path which can guide individual bottles out of the flow. Alternatively, the bottles may also be pushed out of the main flow path by a pusher mechanism.

The apparatus according to the invention may also be used with advantage with other bottle-checking apparatus. In such an arrangement the scanning devices of the present invention may be located upstream of other bottle-checking apparatus.

Embodiments of the invention will now be described by way of example with reference to the accompanying drawings in which.

Figure 1:
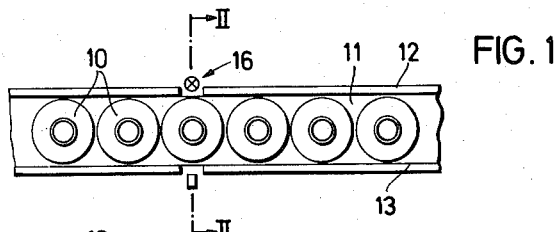
FIG. 1 is a plan view of apparatus for determining residual lye content in beer bottles.
Figure 2:
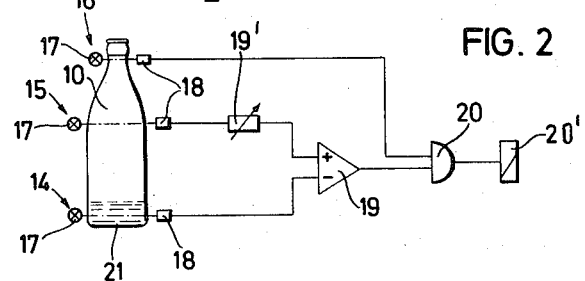
FIG. 2 is a diagrammatic section along the line II—II of FIG. 1 and shows the disposition of the scanning devices and the means for evaluating the corresponding signals in a block diagram.

Referring to FIGS. 1 and 2, the bottles 10 pass in a row in close succession along a conveying channel 11 which is laterally bounded by walls 12 and 13. Scanning devices 14, 15 and 16, referred to hereinafter, respectively, as the first, second, and third scanning devices, are arranged one above the other across the conveying channel 11. The scanning devices each comprise a light source 17 such as an incandescent lamp and a photocell 18 sensitive to the illumination from the light source 17. The light source or lamp 17 continuously generates a light beam extending transversely to the direction in which the bottles 10 are conveyed, the illumination being directed onto the photocell 18.

The first scanning device 14 is located near the base of the bottle 10, while the second scanning device 15 is located at the upper end of the cylindrical portion of the bottle 10. The third scanning device 16 is located at the level of the neck of the bottle which is of tapered design.

Referring to FIG. 2, the voltage supply lines to the lamps and photocells are not shown, the lines simply representing circuitry to illustrate the principle of operation. The output signals from the photocells 18 of the first and second scanning devices are transmitted to a differential amplifier 19. The output signal from the photocell 18 of the second scanning device 15 passes through a potentiometer 19' which can be adjusted so that slight mistuning of the voltage balance between the signals from the photocells of the first and second scanning devices can be achieved. This serves to avoid faulty ejection of bottles and creates a stable range of tolerance. The differential amplifier 19 compares the two voltages, and when the inequality between the two voltages is above a predetermined level a pulse-type output signal of predetermined amplitude is emitted by the amplifier 19. This pulse-type output signal is transmitted to one input of an AND gate 20. The other input of the AND gate is connected to the photocell 18 of the third scanning device 16. The output of the AND gate 20 controls a relay 20' which in turn controls an ejector device for separating out bottles which do not meet predetermined requirements.

The third scanning device 16 ensures that the signals emitted by the other two scanning devices 14 and 15 are effective only when each bottle 10 is centered in front of the scanning devices. Testing of any lateral regions of the bottles at the testing site is therefore avoided.

As shown in FIG. 2, a residual amount of liquid 21 is contained in a bottle 10 which serves to lessen the optical permeability of the bottle with respect to the beam of light emitted by the light source 17 of the scanning device 14. The signal received from the photocell 18 of the scanning device 14 therefore has a smaller amplitude than the signal which is generated by the reference scanning device 15. The differential amplifier 19 therefore generates an output signal which actuates the relay 20' provided that the third scanning device 16 has primed the gate 20. This of course will be dependent upon whether the neck of the bottle is in line with the light beam emitted by the light source 17 of the third scanning device 16.

Instead of the differential amplifier 19, it is possible to use light beam controllers which incorporate photocells connected to voltage dividers supplying the operating voltage for the base of a transistor. With this arrangement, in the state of equilibrium, i.e., when the photocells are excited with the same intensity, the transistor is blocked. When, however, the voltage of one of the photocells increases, the transistor is opened causing the transistor to transmit a signal to actuate the relay 20'.

Alternatively, the output of the potentiometer 19' may be fed to a threshold amplifier designed to suppress the output signal of the differential amplifier 19 when the output signal does not exceed a predetermined minimum threshold.

Figure 4:
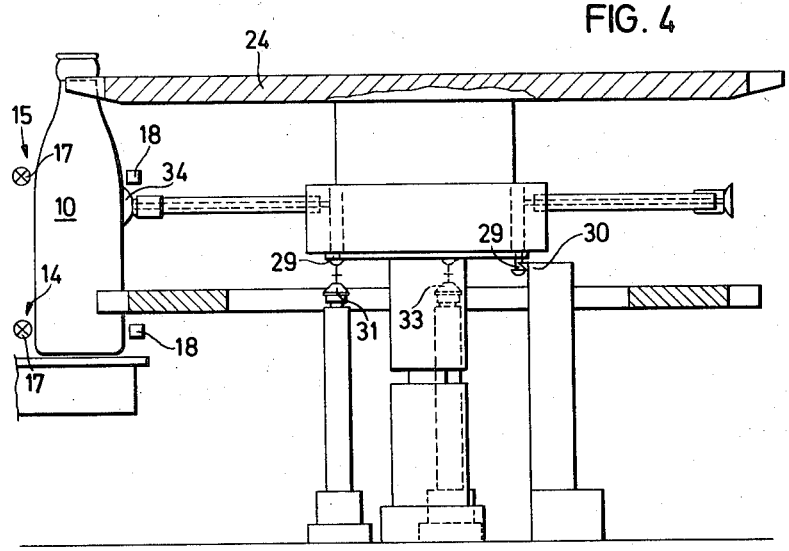
FIG. 4 shows a section through the bottle-handling apparatus.
Figure 3:
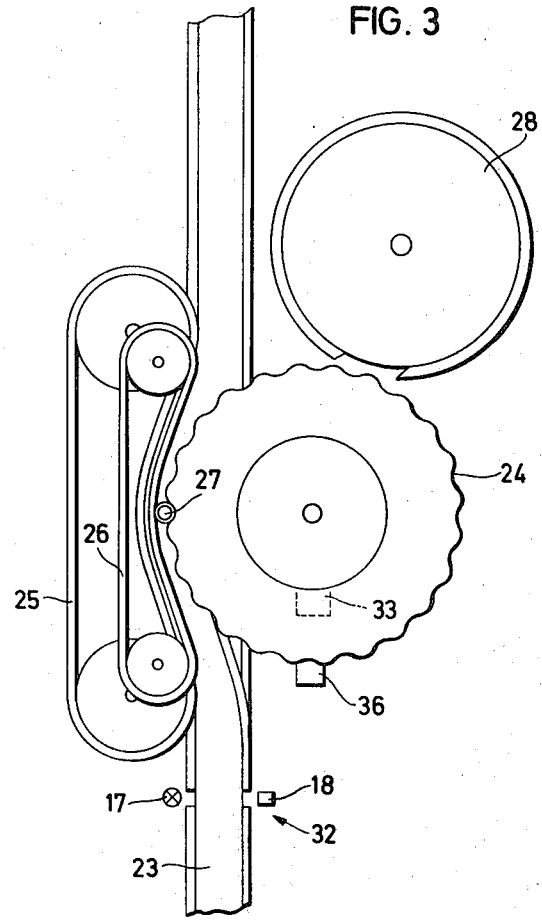
FIG. 3 is a plan view of the apparatus according to the invention in combination with bottle-handling apparatus.

Referring to FIGS. 3 and 4, there is shown a bottle-handling apparatus which includes the testing device of the present invention. The conveying channel for the bottle 10 is denoted 23. The bottles are guided in sequence between the scallops of a starshaped rotatably mounted securing device 24. The bottles are pressed by the securing device 24 against superimposed elastic belts 25 and 26 as the securing device rotates. At the testing position 27 each bottle in succession is tested by transillumination in the vertical direction to determine the presence of foreign material in the bottom of the bottle. Bottles which test satisfactorily are automatically conveyed further along the conveying channel 23 while the bottles found to be undesirable are secured by a suction device 34 after which the bottle to be rejected is carried off the conveying channel by the rotating securing device and deposited on a collecting table 28. A suction device 34 is positioned below each scallop or bottle position on the periphery of the rotatably mounted securing device. The suction to each suction device 34 is controlled by an axially extensible pin 29. All of the pins 29 are pulled downwardly by an extractor device 30. If a bottle 20 located in the test position must be rejected, a ram 31 is actuated pushing the appropriate pin 29 upwardly causing the suction device 34 located adjacent the bottle to receive vacuum, gripping and retaining the bottle until the rotatably mounted securing device 24 has reached the collector table 28 whereupon the extractor device 30 pushes the pin 29 upwardly terminating suction to the corresponding suction device 34 releasing the rejected bottle.

In accordance with the present invention a further test position 32 is located at a point along the conveying channel 23 upstream of the position 27. The first and second scanning devices 14 and 15 are arranged at the further test position 32, each comprising a light source 17 and a photocell 18 which are coupled to the comparator circuit shown in FIG. 2. If this circuit emits an ejection signal, the pin 29 associated with the suction device 34 at a distance from the test position 27, which corresponds to the distance between test positions 23 and 27, is pushed upwardly by the additional ram 33 so that when the bottle to be ejected has reached the test position 27 the suction device 34 engages that bottle in the manner as previously described.

In place of the third scanning device 16 shown in the embodiment of FIGS. 1 and 2, which scanning device ensures that each bottle 10 is centered at the test position, a stationary scanner device 36 similar to scanner device 16 may be provided which cooperates with the rotatably mounted securing device 24. The stationary scanner device 36 is so positioned that the photocell is actuated when the light beam from the source passes the central and deepest portion of each scallop in the periphery of the rotatably mounted securing device. Assuming that the bottles passing along the conveying channel 23 are spaced from each other by a distance corresponding to the distance between adjacent scallops of the securing device 24, it will be appreciated that the stationary scanner 36 will only permit testing at test position 32 when a bottle is centered at the test position 32, since this corresponds to the centering of a scallop of the securing device 24 relative to the stationary scanner device 36.

The foregoing description has been given for clarity of understanding only and no unnecessary limitations should be understood therefrom as modifications will be obvious to those skilled in the art.

I claim:

1. Apparatus for testing a bottle to detect the presence of material contained therein, comprising
   a. first and second scanner devices, each comprising a light source and a photocell, each said photocell being sensitive to the light from its respective light source and adapted to emit an electrical signal, the amplitude of which is proportional to the intensity of the light received,
   b. said scanner devices being arranged to permit said bottle to simultaneously be positioned between both said light sources and photocells, and said first and second scanner devices being arranged such that the light from the respective light sources simultaneously passes through spaced walls of the bottle, respectively, at a first level adjacent to the bottom of the bottle and at a second level spaced from said first level and at which the cross-section of the bottle is about the same as at the first level, and
   c. amplifier means for comparing the amplitudes of said electrical signals simultaneously emitted from said two photocells and for generating a further signal only when the amplitudes of said electrical signals differ by a predetermined amount,
   d. whereby a bottle containing residual material in the bottom thereof may be detected.

2. Apparatus according to claim 1 further comprising sensing means for determining the attitude of said bottle and transmitting a signal to said amplifier means to restrict the generating of said further signal to a time when said bottle is at a predetermined attitude between said respective light sources and photocells.

3. Apparatus according to claim 2 wherein said sensing means comprises a further light source and a further photocell sensitive to the light from said further light source and adapted to emit a further electrical signal, said further light source and further photocell being spaced from each other and arranged at the level of the neck of said bottle.

4. Apparatus according to claim 3 further comprising means for conveying bottles in series along a path passing between the respective light sources and photocells of said first and second scanner devices and the light source and photocell of said sensing means, and blocking means for interrupting movement of said conveyor means in response to a further signal generated by said amplifier means.

5. Apparatus according to claim 4 further comprising ejecting means responsive to said further signal generated by said amplifier means for removing a detected bottle having residual material therein.

6. Apparatus according to claim 5 wherein said first and second scanner devices are located upstream along said path from said ejecting means, said ejecting means comprising rotary securing means responsive to said further signal generated by said amplifier means for securing a detected bottle and withdrawing it from said path.

7. Apparatus according to claim 6 wherein said rotary ejecting means further comprises a plurality of suction devices and means responsive to said further signal generated by said amplifier means to selectively control the vacuum to said suction devices to selectively engage bottles which have been detected.

8. Apparatus according to claim 7 wherein said rotary ejecting means is adapted to rotate synchronously with movement of said bottles along said path, said rotary ejecting means further comprising a sensing device for sensing the rotary position of said ejecting means and transmitting a signal to said amplifier means such that said further signal is generated by said amplifier means only when each bottle is at a predetermined attitude.

9. A method for testing a bottle to detect the presence of material contained therein, comprising
   a. simultaneously passing a pair of light beams through spaced walls of said bottle respectively at a first level adjacent to the bottom of the bottle and at a second level spaced from said first level at which the cross-section of the bottle is about the same as at the first level,
   b. simultaneously detecting and measuring the intensity of each of said light beams, and
   c. simultaneously comparing the intensity of said light beams to detect the presence of any residual material contained in the bottom of said bottle.

10. The method according to claim 9 further comprising feeding a plurality of bottles in succession along a path such that each bottle simultaneously passes through said light beams whereby the condition of each bottle may be tested in succession.

11. The method according to claim 10 further comprising detecting the attitude of each bottle as it passes through said light beams and measuring the intensity of said respective light beams only when each bottle has reached a predetermined attitude.

* * * * *